4 Sheets—Sheet 1.

M. HUMPHREY.
Machine for Dropping Corn and Phosphate.

No. 227,359. Patented May 11, 1880.

Witnesses
C. O. Foss
Chas. C. Luna

Inventor
Moses Humphrey

M. HUMPHREY.
Machine for Dropping Corn and Phosphate.

No. 227,359.

Patented May 11, 1880.

Witnesses

Inventor.
Moses Humphrey

M. HUMPHREY.
Machine for Dropping Corn and Phosphate.

No. 227,359. Patented May 11, 1880.

Witnesses
C. O. Foss
Chas. C. Linna

Inventor
Moses Humphrey

4 Sheets—Sheet 4

M. HUMPHREY.
Machine for Dropping Corn and Phosphate.

No. 227,359.   Patented May 11, 1880.

Witnesses
C. O. Foss
Chas. C. Luca

Inventor
Moses Humphrey

UNITED STATES PATENT OFFICE.

MOSES HUMPHREY, OF CONCORD, NEW HAMPSHIRE.

MACHINE FOR DROPPING CORN AND PHOSPHATES.

SPECIFICATION forming part of Letters Patent No. 227,359, dated May 11, 1880.

Application filed November 28, 1879.

*To all whom it may concern:*

Be it known that I, MOSES HUMPHREY, of Concord, in the county of Merrimack and State of New Hampshire, have invented certain Improvements in Machines for Dropping Corn and Phosphate, of which the following is a specification, reference being had to the accompanying drawings, which are made a part hereof, in which drawings—

Figure 2:
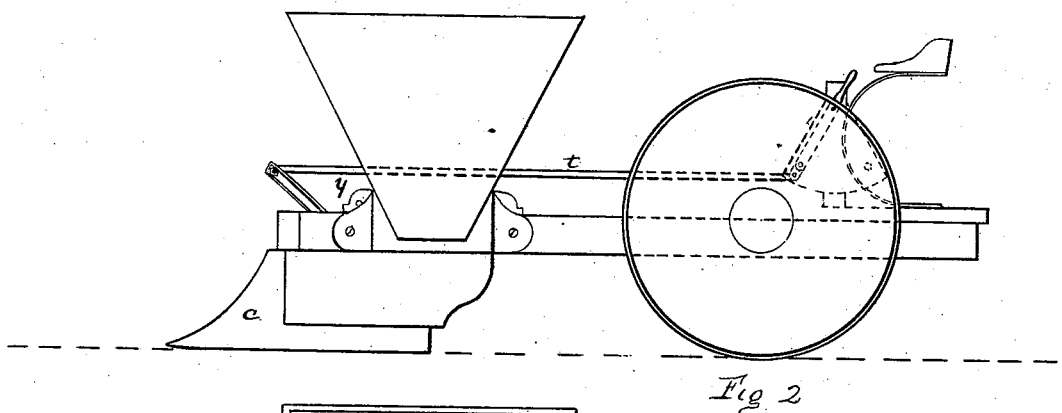
Figure 1:
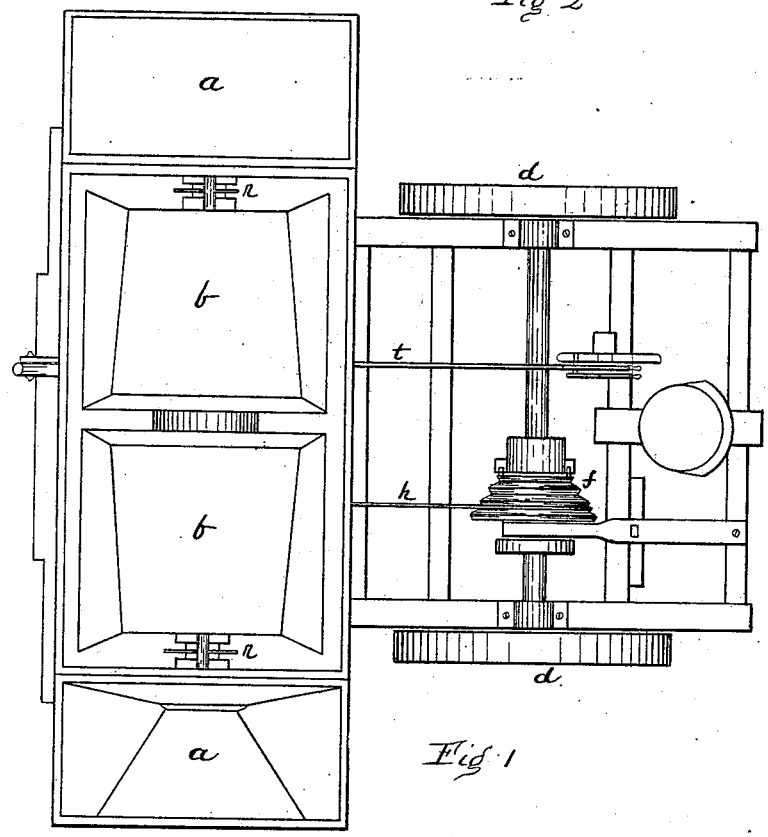

Figure 1 is a top plan, and Fig. 2 is a side elevation, and the remaining figures illustrate the mechanism of my machine, as will hereinafter be more fully explained.

The object of my invention is to provide a machine to be operated by horse-power for the dropping of corn and phosphate.

At $a\ a$, Fig. 1, are represented hoppers for carrying corn. At $b\ b$, Fig. 1, are represented trays for carrying phosphate.

Figure 4:
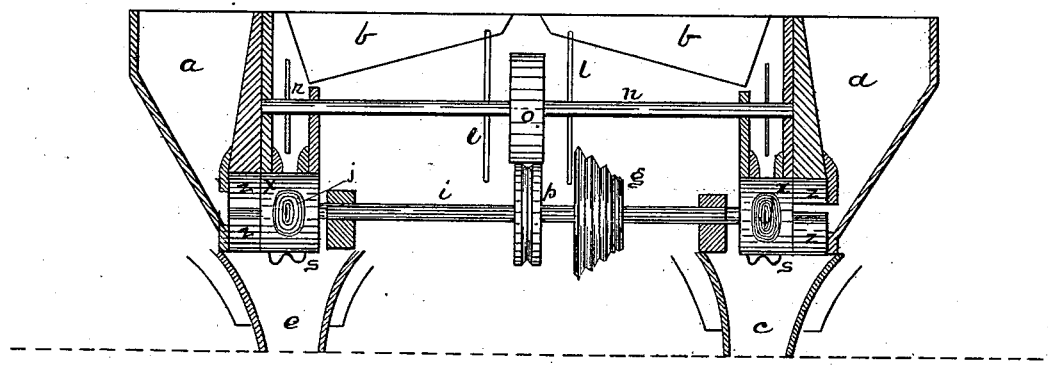
Figure 6:
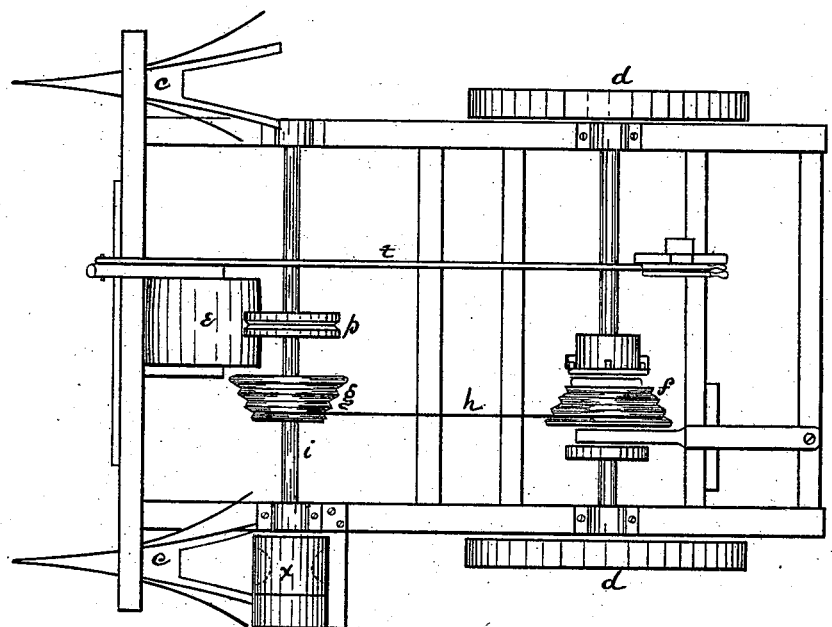
Figure 7:
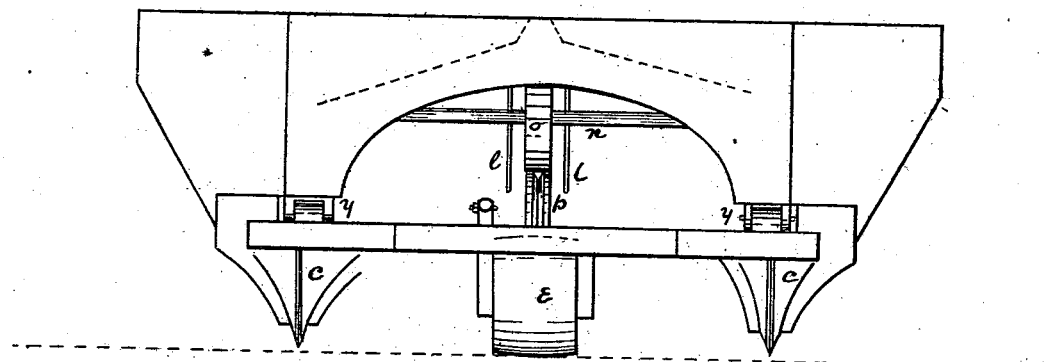

$c$, Fig. 2, represents a plow, two of which are provided, as shown in Figs. 4, 6, and 7.

$d\ d$, Figs. 1, 2, 3, 5, and 6, represent driving-wheels, which drive the mechanism and carry the weight of the rear part of my machine, the front end of which rests upon the plows when in use.

Figure 5:
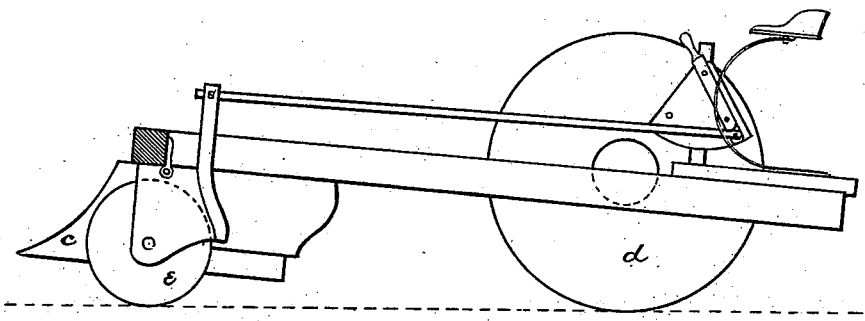

When turning at the end of rows, or when moving from place to place when not in use, the front end of my machine is carried upon the roller $e$, (shown in Figs. 5, 6, and 7.) Fig. 5 more particularly illustrates the use thereof in elevating the forward end of my machine and lifting the plows from the ground.

Upon the main axle-tree, between the driving-wheels, I place cone-pulleys, (shown at $f$, Figs. 1 and 6,) with mechanism for throwing in and out of gear, operated by a lever near the driver's seat. A corresponding cone-pulley, $g$, Fig. 6, is placed upon a shaft near the forward end, (shown in Figs. 4 and 6,) which pulleys are connected by a belt or chain, $h$, by means of which the relative speed of the two shafts is regulated, thus adjusting the machine for planting at different intervals between hills.

The forward cone-pulley, $g$, Fig. 6, is placed upon a shaft, $i$, Figs. 4 and 6, and upon the ends of this shaft, over my plow and underneath the hopper, I place cylinders $x\ x$, provided with openings for corn and phosphate, respectively, and by the revolution of these cylinders the corn and phosphate, in suitable quantities, are dropped into the furrow made by the plow.

Figure 8:
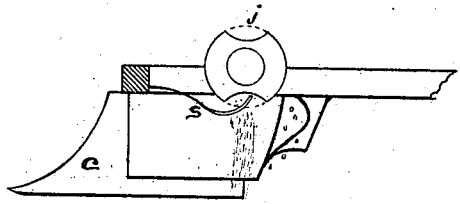

The opening or cell in the cylinder which drops the phosphate is shown at $j$, Figs. 4 and 8, and consists of a semicircular excavation in the body of the cylinder, which receives the phosphate from the trays in such quantity as may be desired, and carries it over and drops it in the plow. The corn is taken from the hopper $a$ into the end of said cylinder, (shown in section in Fig. 3,) passing into the circular opening in the center $k$, and being discharged, as the cylinder revolves, through the opening $m$ into the furrow at the rear end of the plow.

At $l\ l$, Figs. 4 and 7, are shown pins fixed in the shaft $n$, which pins are for the purpose of agitating the trays to help the movement of the phosphate from the trays. This shaft is driven by a friction-pulley, $o$, which runs upon another friction-pulley, $p$, fixed upon the shaft $i$; or, in the place of these last friction-pulleys, I may substitute a gear.

At the ends of the shaft $n$, I also place other pins, $r\ r$, which, in their revolution, stir the phosphate and prevent it from becoming hard and forming cakes, so as not to pass freely through the machine.

I also provide a spring-scraper, (shown at $s$, Figs. 4 and 8,) which scrapes the phosphate from the cell $j$, and will not permit the cell to become clogged by phosphate lodging therein and becoming hard.

The forward end of my machine is elevated so as to lift the plows by means of a lever, $t$, (shown in Figs. 1 and 2,) which is operated from the driver's seat by any convenient mechanism.

I do not confine myself to the use of two plows, but may use the same mechanism for dropping corn and phosphate in one row or more.

Figure 3:
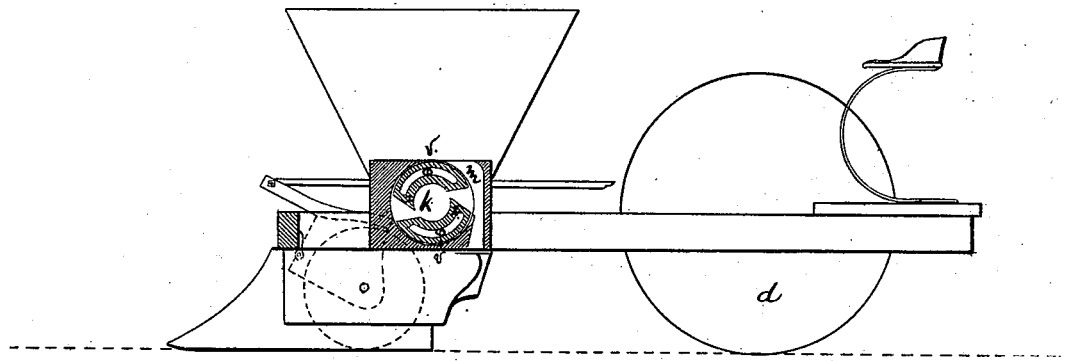

At $v\ v$, Fig. 3, are shown set-screws, by means of which the position of the slotted segments $z\ z$, Figs. 3 and 4, are so adjusted that the corn may be dropped closely in the rear of the phosphate, or at any interval of distance up to six inches. This is accomplished by placing the opening which discharges the corn so that the discharge will take place a little later than the discharge of the phosphate, the exact position being found by experiment to suit the ideas of the person operating the machine.

For the purpose of getting at the cylinders and cleaning them when necessary the central portion of my machine turns forward upon hinges, (shown at $y\ y$, Figs. 2 and 7.)

The projecting nose of my plows, in front, will clear away the roots, stalks, and bunches of manure which may lie in the way, and will not become clogged like the plows which have a vertical forward part.

I claim as my invention and desire to secure by Letters Patent—

1. The shaft $i$, having the cylinders $x\ x$, constructed with the concave phosphate-receptacles and circular corn-receivers, combined with the shaft $n$, hoppers $a\ a\ b\ b$, and the main shaft, having the driving-wheels $d\ d$, substantially as set forth.

2. The cylinders $x\ x$, constructed with the concave phosphate-receptacles $j\ j$ and circular corn-receivers $k\ k$, the latter being made adjustable by the set-screws $v\ v$, substantially as set forth.

3. The shaft $i$, having the friction-pulley $p$, combined with the shaft $n$, having friction-pulley $o$, and pins $l\ l$ and $r\ r$, whereby the trays $b\ b$ are agitated, and also the phosphate stirred as it passes from them, substantially as set forth.

4. In a machine for dropping corn and phosphate, the revolving shaft $n$, provided with pins $l\ l$, for agitating the trays $b\ b$, and pins $r\ r$, for stirring the phosphate in the hopper, arranged and operating substantially as described.

5. The combination of the phosphate-trays $b\ b$, the shaft $n$, having pins $l\ l$ and $r\ r$, and the cylinders $x\ x$, having the concave phosphate-receptacles $j\ j$ and spring-scrapers $s\ s$, substantially as set forth.

MOSES HUMPHREY.

Witnesses:
   CHAS. C. LUND,
   CHAS. O. FOSS.